(12) United States Patent
Palmer et al.

(10) Patent No.: US 12,231,556 B2
(45) Date of Patent: Feb. 18, 2025

(54) OPTICAL PHYSICALLY UNCLONABLE FUNCTION DEVICE

(71) Applicant: TTP Plc., Royston (GB)

(72) Inventors: Timothy John Palmer, Royston (GB); Michael Beck, Royston (GB)

(73) Assignee: TTP Plc, Royston (GB)

( * ) Notice: Subject to any disclaimer, the term of this patent is extended or adjusted under 35 U.S.C. 154(b) by 518 days.

(21) Appl. No.: 17/620,446

(22) PCT Filed: Jun. 18, 2020

(86) PCT No.: PCT/GB2020/051475
§ 371 (c)(1),
(2) Date: Dec. 17, 2021

(87) PCT Pub. No.: WO2020/254810
PCT Pub. Date: Dec. 24, 2020

(65) Prior Publication Data
US 2022/0239468 A1 Jul. 28, 2022

(30) Foreign Application Priority Data
Jun. 18, 2019 (GB) ..................................... 1908682

(51) Int. Cl.
*H04L 9/08* (2006.01)
*H04L 9/32* (2006.01)

(52) U.S. Cl.
CPC ............ *H04L 9/088* (2013.01); *H04L 9/3278* (2013.01)

(58) Field of Classification Search
CPC ... H04L 9/088; H04L 9/3278; H04L 2209/12; H04L 9/3271; H04L 9/08; G09C 1/00
See application file for complete search history.

(56) References Cited

U.S. PATENT DOCUMENTS

| 2006/0024017 A1* | 2/2006 | Page | G02B 6/0036 |
| | | | 385/146 |
| 2015/0237940 A1* | 8/2015 | Brown | A41G 1/007 |
| | | | 428/20 |
| 2017/0134174 A1* | 5/2017 | Cambou | G02B 1/002 |

(Continued)

FOREIGN PATENT DOCUMENTS

WO 2019021206 A2 1/2019

OTHER PUBLICATIONS

PCT Patent Application PCT/GB2020/051475 International Search Report and Written Opinion issued Sep. 8, 2020.

*Primary Examiner* — Quazi Farooqui
(74) *Attorney, Agent, or Firm* — Erise IP, P.A.

(57) ABSTRACT

A physically unclonable function (PUF) device comprises a plurality of optical fibres, at least some of which are arranged such that they are optically coupled. A media surround at least a portion of the optical fibres and at least one light source is configured to transmit light through one or more of the optical fibres. There is provided at least one light sensor configured to receive the transmitted light from one or more of the optical fibres and provide an output. Circuitry applies a challenge signal to at least one of the fibres using at least one light source and receives the output from the at least one light sensor, using the output to generate an identifying response to the challenge signal. The fibres are arranged such that the identifying response is unique to the device.

17 Claims, 1 Drawing Sheet

(56) References Cited

U.S. PATENT DOCUMENTS

2017/0164191 A1 6/2017 Orcutt
2018/0103374 A1 4/2018 Huang et al.
2019/0156066 A1 5/2019 Foster et al.

* cited by examiner

OPTICAL PHYSICALLY UNCLONABLE FUNCTION DEVICE

RELATED APPLICATIONS

The present application is a national stage application under 35 U.S.C. § 371 of International Application No. PCT/GB2020/051475, filed 18 Jun. 2020, which claims priority to Great Britain Patent Application No. 1908682.6, filed 18 Jun. 2019. The above referenced applications are hereby incorporated by reference in their entirety.

BACKGROUND

The present invention relates to a Physically Unclonable Function (PUF) device that maps an input (challenge) to an output (response) that is well-defined but difficult to duplicate or reverse-engineer. The invention employs optical fibres and has applications within device security, authentication, counterfeit protection and tamper-proofing.

Existing PUFs typically exploit manufacturing differences between identical silicon circuits, however these lack sufficient entropy to be truly unclonable. Similarly, these silicon implementations can be easily decapsulated and measured without affecting the response. Even in scenarios where the device cannot be decapsulated, the response of a silicon PUF can often be modelled based upon a small number of challenge-response pairs (CRPs), or prior knowledge of the manufacturing process. Alternative PUF types do exist, but these require external read-out circuitry, and are vulnerable to 'black-box' attacks. The proposed invention avoids these issues by providing a novel method of generating an intrinsic response based on physical characteristics that cannot be easily modelled.

Cryptographic primitives used in encryption assume 3 key features: Secure Key Generation, Secure Key Storage and Secure Execution. Analysis has shown a distinct lack of randomness in commonly used public keys, whilst the contents of said keys can be read directly from non-volatile digital memory even with extensive countermeasures.

Current methods of generating and storing these keys in memory, in such a way that protects them from common types of attack, are both difficult and expensive. PUFs offer new cost-effective ways through which these keys can be securely generated and protected from malicious actors. They were first proposed with a view to identifying individual ICs by their manufacturing defects. PUFs work by generating a key that is unique to the device, based on some physical characteristic of the device itself. The key is generated and read out by challenging the PUF, measuring the response and then performing some form of computation.

As the key is generated by the physical characteristics and manufacturing variabilities of the device, it should be impossible to create a physical copy or accurately model the response of the system to simulate it in software. If some individual attempts to measure the response of the PUF when subject to a challenge, the response should change sufficiently to invalidate the PUF, and protect the secret contained within the PUF. The lack of interchangeability between the challenges and responses leads to the idea of the Challenge-Response Pair (CRP)—each challenge maps directly and irreversibly to one response.

As the ideal PUF cannot be copied or modelled, it is truly unclonable, and so a key generated or stored by the PUF cannot be illegitimately extracted/copied. Additionally, the generated response must be reproducible, once variations in environmental conditions, such as temperature and humidity are accounted for, and the time to generate a response should be neither too fast (reducing the time required to collect CRPs for a brute force attack) or too slow (reducing the availability of any function relying on the PUF).

PUFs have many applications:

Remote Challenge-Response Authentication: A simple example of this is password authentication, where the challenge is the request and the response the correct password. In the case of a PUF, one or more CRPs would be collected from the device during a registration stage. The device can subsequently be checked for authenticity by issuing a challenge and getting the desired response in return. The correct responses are not stored within the PUF, but are generated as a function of its physical structure, so the PUF is inherently robust to invasive attacks (that may attempt to read stored secrets). Many challenge-response pairs could be registered, so that each pair would only need to be used once (a one-time password), meaning that the system would be robust against replay attacks. The system doesn't require continuous power, or time synchronisation, unlike other 1-time authentication systems.

Encryption Relationship Management: The response of the PUF to a given challenge could be used to form a private encryption key. Again, the key would not be stored within the PUF itself, rendering it robust to invasive attacks.

Encryption Key Storage: Consider a situation where a field-programmable gate array (FPGA) is used to perform a custom process, and utilises an encrypted stream requiring the physical storage of a private key. This private key may therefore be vulnerable to a physical attack. By generating the key each time it is required, thus not storing it in electronic memory, the key is no longer vulnerable to unauthorised read-out.

Object Authenticity Verification: In this use-case, the PUF may either be embedded within the object to be verified, with some sort of external readout mechanism, or alternatively, the PUF may entirely enclose the physical object to be protected, and the challenge-response mechanism may be used to either ensure that the enclosed physical object has not been tampered with, or even to provide the code to a physical unlocking mechanism, which requires a complete challenge-response pair to unlock. Any attempt to interfere with the enclosure should change the response of the PUF and then be obvious to the possessor of the correct challenge-response pair(s).

However, current PUFs can either be accurately modelled or lack sufficient entropy to act as a true security layer for secure key storage. PUFs exploiting manufacturing differences within a FPGA are too easily measured using low-cost equipment and modellable; the secure keys generated using initial SRAM states are too easily read-out; and current EM-based PUFs are expensive and/or have a limited number of challenge-response pairs, allowing for potential replay attacks.

Embodiments of the PUF of the invention can solve these issues as:

- The number of Challenge-Response Pairs is large, based on the selection of fibres within the PUF.
- The full Challenge-Response mechanism can be enclosed within the PUF, preventing external measurement of the PUF properties,
- The use of optical coupling for the generation of CRPs further reduces the opportunity for an adversary to model the PUF through side-channel measurements.

The PUF cannot be readily modelled due to the random arrangement of the optical fibres, and hence the random positions of the contacts and/or coupling locations between the fibres.

Any attempt to probe the PUF will alter the measured response.

The PUF can be used to encapsulate any sensitive electronics, reducing the opportunity for an adversary to measure the PUF response.

The proposed invention exploits the coupling of photons between distinct optical fibres that have been locally joined, or are in very close proximity to one another, to form a tangled weave. A subset of the optical fibres within the weave are briefly illuminated by the application of a light source pulse, and the response is detected on some subset of the optical fibres. The nature of the PUF means that it can also be deployed in a variety of form factors, including enveloping the circuit to be protected. Any attempt to open the unit, or measure the coupling between fibres, should change the coupling between fibres, or introduce a new baseline stimulus, which will change the response of the PUF. The specific arrangement of the optical fibres should be sufficiently different between different devices to ensure that each PUF is unique, whilst also maintaining the unpredictability of the PUF response.

In a preferred example of the invention, the interactions between optical fibres are made more complex by poor and/or irregular coating of the fibres, and/or the inclusion of optically transmissive particles near the fibres.

According to the present invention there is provided a physically unclonable function (PUF) device comprising:
- a plurality of optical fibres, at least some of which are arranged such that they are optically coupled;
- a media surrounding at least a portion of the optical fibres;
- at least one light source configured to transmit light through one or more of the optical fibres;
- at least one light sensor configured to receive the transmitted light from one or more of the optical fibres and provide an output; and
- circuitry for applying a challenge signal to at least one of the fibres using the at least one light source and for receiving the output from the at least one light sensor to generate an identifying response to the challenge signal, the fibres being arranged such that the identifying response is unique to the device.

BRIEF DESCRIPTION OF THE DRAWINGS

Examples of the present invention will now be described with reference to the accompanying drawings in which.

DETAILED DESCRIPTION

Construction of the PUF Element

Figure 1:
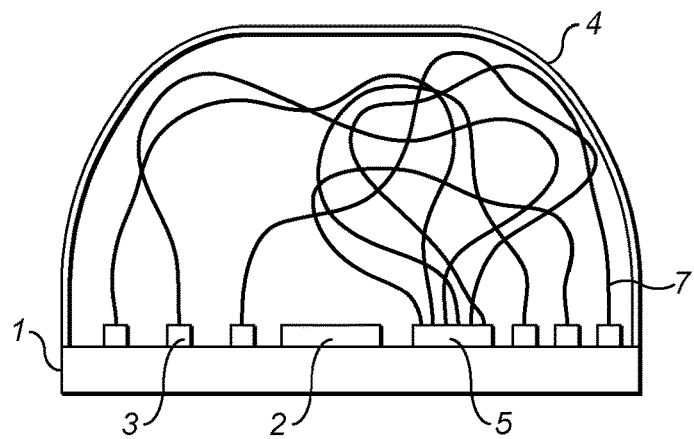
FIG. 1 shows an example PUF device according to the invention.

FIG. 1 shows a simplified conceptual diagram of the PUF device, with a reduced number (e.g. six) of optical fibres 7 distributed throughout the 3D-space in which they are randomly arranged and encapsulated within a surrounding media 4 which forms an enclosure. In this embodiment, a PCB 1 supports some circuitry 2 which comprises both the circuitry to be protected and the CRP generation circuitry.

Light sources 3 are provided to transmit light through the optical fibres 7 to be detected by an optical sensing array 5. Where the fibres 7 come into close proximity with one another, photons may evanescently couple between fibres.

Figure 2:
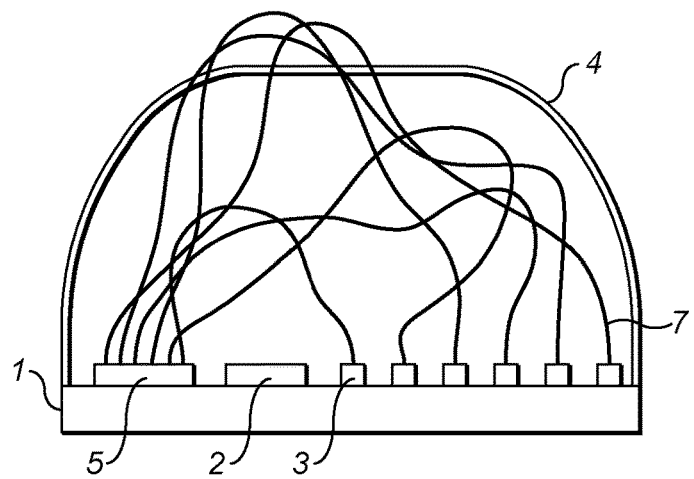
FIG. 2 shows an example of a second PUF device according to the invention.

The media 4 may completely encapsulate the optical fibres 7 or only enclose a portion of the fibres 7. The fibres 7 may form a tangled weave as the lengths of the fibres 7 are orders of magnitude greater than the length scales of the enclosure. These fibres 7 may be arranged in a predetermined pattern, e.g. by mounting on a pre-constructed array, or randomly through the natural bend radii of the fibres 7 as they are compressed to fit within the enclosure form factor. In embodiments where the optical fibres 7 are not completely encapsulated by the media 4, as shown in FIG. 2, they may still be arranged randomly or according to a predetermined pattern.

In regions where the fibres 7 are in close proximity with one another photons may evanescently couple between the fibres 7. This provides a complex optical coupling between each permutation of the fibres 7. Optionally, the fibres 7 may be poorly coated or irregularly coated with an opaque or translucent coating to further increase the complexity of the coupling. Further optionally, particles may be randomly introduced into the surrounding media which will modify the coupling between fibres. Preferably, in examples of the invention where the optical fibres 7 are not completely encapsulated by the media 4, lengths of the fibres 7 not encapsulated are covered with an opaque coating. Thin films of materials, such as Molybdenum Sulphide, Tungsten Sulphide and Tungsten Selenide, may be used to coat the fibres 7 to allow for local fluctuation of the refractive index in order to change the effective coupling point between fibres 7.

The optical fibres 7 may be commercially available fibres of a single grade or be a variety of grades and diameters of fibre to introduce additional complexity into the PUF. Furthermore, these fibres 7 may be single-mode or multi-mode to allow for different coupling between the fibres 7. Areas of the fibre weave may also be subject to a high pressure or temperature to fuse the fibres 7 at points where they locally contact in order to improve coupling and prevent movement between the fibres 7.

Other forms of optical paths or waveguides capable of transmitting light and allowing coupling of photons may also be used in place of the optical fibres 7.

The optical fibres 7 may be arranged such that all paths have a good probability of interacting when in close proximity and in the absence of the opaque coating. This arrangement of the fibres 7 ensures that the response of the PUF instantiation is unpredictable. The arrangement of the fibres 7 may be calculated by an optimisation algorithm whereby the cost function is related to the deviation of the integrated fibre couplings. The fibre 7 routing may also be changed between different instantiations of the PUF, provided the integrated coupling between fibres 7 is sufficient to provoke a complex, non-predictable, tamper-proof response.

The surrounding media 4 may be opaque or partly translucent to allow for further coupling of photons in and out of the fibres 7 used in the CRP generation, when the media 4 is partly translucent it is coated with an opaque outer layer. The media 4 may further encapsulate other components of the PUF device and form an enclosure with a hollow interior. Alternatively, the media 4 may set around the fibres 7 and/or other components to assist fixing the fibres 7 in place, while still allowing for coupling between fibres 7.

Examples of possible light sources 3 used for transmitting light through the fibres 7 include LED sources and LASER sources. In an embodiment of the invention, each source 3 may be provided with and linked to a single fibre 7. However, in other embodiments, multiple sources 3 may be connected to a single fibre 7 or an individual source 3 may be connected to several fibres 7. Due to the coupling between fibres 7, it is not necessary that each fibre 7 is directly connected to a source 3. Combinations of each of the above arrangements of sources 3 and fibres 7 may be used in a single PUF device to tune the complexity of the device accordingly. The light sources 3 used in the PUF may emit visible light and/or non-visible light wavelengths of the electromagnetic spectrum.

The optical sensing array 5 may comprise a single sensor 6, such as a CCD sensor, or a number of distributed discrete sensors 6. Similarly to the light sources 3, any number of sensors 6 may be connected to any number of fibres 7 depending on the desired complexity and structure of the PUF.

The circuitry 2 for controlling the PUF should also include means to correct any errors to ensure a repeatable key is produced within the required response time. This may be fuzzy logic, such as a fuzzy extractor, that ensures that small changes in the physical response (e.g. noise) do not lead to changes in the response. Environmental factors such as temperature are anticipated to have a well-known relationship to the measured response for a given challenge, and may be calibrated out by checking a fixed set of reference keys with known responses that were evaluated at registration.

The measurement circuitry may comprise a single, large CCD array, or be constructed from a series of smaller arrays, which could also be distributed throughout the PUF device within the enclosure.

The entire device may be fixed to a solid structure, or made flexible and shaped to the desired form factor for the initial registration process. The material and substrate selection may also be altered to adjust the entropy of the system, and to meet other constraints of the system such as thermal control.

PUF Interfacing

The interface between the PUF and the application may be specific to the application. In an embodiment of the device, there is provided a dedicated control circuit for the generation of CRPs. The electronics/control circuit may be implemented as an ASIC, or by a combination of commercial-off-the-shelf components enclosed within an effective tamper-proof region (such as the encapsulating media 4). These electronics may act to limit access to the PUF, for example by reducing the effectiveness of 'brute force' attacks by artificially throttling the number of CRPs that may be generated by the PUF within a given timeframe.

Figure 3:
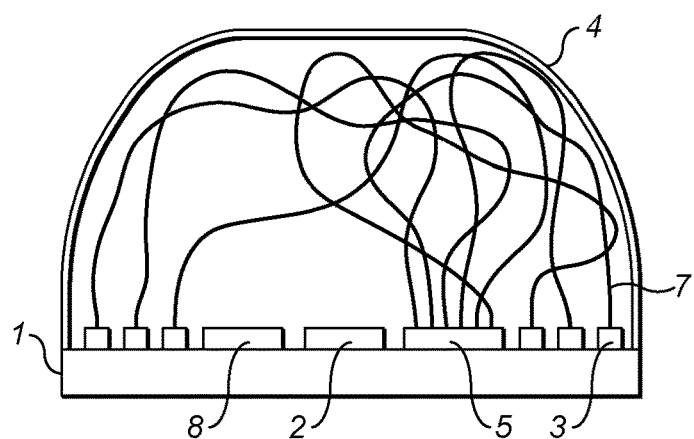
FIG. 3 shows an example PUF device according to the invention which encases other components.

In another embodiment of the device, the PUF device may be used to fully/partially enclose other elements to provide protection to those elements, this is shown in FIG. 3. The components of the PUF and the other protected components 8 are contained within the encapsulating media 4. For example, the protected components 8 could be microprocessor and encrypted storage module. Attempts to disassemble or probe inside the PUF will cause a change in the optical properties of the PUF device (in particular the optical fibres 7, the media 4, and light sensors 6), leading to a change in the response generated for a given challenge, and preventing decryption of the storage module.

Operation of Device

In use the PUF is passed a challenge from an external circuit via the PUF circuitry 2. The circuitry 2 converts the request, which could be received as a serial command, into a challenge which can be fed to the PUF instantiation. For example, in a PUF with twenty optical fibres 7, four of these may be stimulated with a light pulse (of a given timing, frequency, amplitude, modulation and phase) from the light source(s) 3 and the response measured on six possible coupled fibres 7 by the optical sensing array 5. The timing, amplitude and modulation of the light coupled into the response fibres 7 is then converted into a response vector, which may then be converted back into a serial stream by the PUF circuitry 2 and fed back to the external circuit.

Between challenges, the number of fibres 7 involved in the challenge may change, as may the number of fibres 7 used to detect the response. The specific optical paths used within the challenges and response may also be changed between challenges, or kept the same.

If an adversary attempts to probe the response signals, by creating a hole in the enclosure or media, the presence of the hole should cause a sufficient deviation in the response for a given challenge to invalidate the PUF and render the device unreadable. This could occur due to damage to the optical fibres 7 used in the generation of the response (this is likely if the fibre length is significantly larger than the size of the enclosure), or from the presence of additional light within the enclosure, or a change in light distribution within the media.

The initial registration process will be dependent on the use of the proposed invention, but is a necessary step to use the PUF in a practical implementation. For remote authentication, the challenge-response pairs may be queried and stored securely during a registration process. For secure key storage, this must be a one time and irreversible procedure.

The invention claimed is:

1. A physically unclonable function (PUF) device comprising:
   a plurality of optical fibres, at least some of which are arranged such that they are optically coupled;
   a media surrounding at least a portion of the optical fibres;
   at least one light source configured to transmit light through one or more of the optical fibres;
   at least one light sensor configured to receive the transmitted light from one or more of the optical fibres and provide an output; and
   circuitry for applying a challenge signal to at least one of the fibres using the at least one light source and for receiving the output from the at least one light sensor to generate an identifying response to the challenge signal, the fibres being arranged such that the identifying response is unique to the device, wherein
   the circuitry for applying the challenge signal is arranged to vary the fibres to which the challenge signal is applied and/or the sensors from which the response is received after each challenge is applied to the device, and/or
   the circuitry for applying the challenge signal is arranged to vary the number of fibres to which the challenge signal is applied and/or the number of sensors from which the response is received after each challenge is applied to the device.

2. A PUF device of claim 1, wherein the circuitry is arranged to control at least one of the timing, frequency, amplitude, modulation and phase of the challenge signal.

3. A PUF device of claim 1, wherein the circuitry is arranged to apply at least a second challenge signal to at least one of the fibres and to receive at least a second output from at least one of the sensors to generate an identifying response to the challenge signal that is unique to the device.

4. A PUF device of claim 3, wherein the second challenge signal is applied to a different set of fibres than the first challenge signal.

5. A PUF device of claim 3, wherein the second output is received from a different sensor than the first output.

6. A PUF device of claim 1, wherein the media is opaque or partly translucent and/or contains a random distribution of particles which modify the coupling between fibres.

7. A PUF device of claim 1, wherein the optical fibres are partially covered by a coating.

8. A PUF device of claim 1, wherein at least some of the optical fibres are in contact with each other.

9. A PUF device of claim 1, wherein the optical fibres are encapsulated within an opaque enclosure.

10. A PUF device of claim 1, wherein at least one optical fibre is coupled with itself.

11. A PUF device of claim 1, wherein the optical receivers, and/or transmitters are encapsulated within an opaque enclosure.

12. A packaged, single-chip, component comprising the device of claim 1.

13. A multi-chip module, or system in-package module comprising the device of claim 1.

14. A tamper-proof electronic sub-assembly comprising:
a physically unclonable function (PUF) device comprising:
  a plurality of optical fibres, at least some of which are arranged such that they are optically coupled;
  a media surrounding at least a portion of the optical fibres;
  at least one light source configured to transmit light through one or more of the optical fibres;
  at least one light sensor configured to receive the transmitted light from one or more of the optical fibres and provide an output; and
  circuitry for applying a challenge signal to at least one of the fibres using the at least one light source and for receiving the output from the at least one light sensor to generate an identifying response to the challenge signal, the fibres being arranged such that the identifying response is unique to the device, wherein
  the circuitry for applying the challenge signal is arranged to vary the fibres to which the challenge signal is applied and/or the sensors from which the response is received after each challenge is applied to the device, and/or
  the circuitry for applying the challenge signal is arranged to vary the number of fibres to which the challenge signal is applied and/or the number of sensors from which the response is received after each challenge is applied to the device.

15. The tamper-proof electronic sub-assembly of claim 14, wherein at least one of the optical receivers and the transmitters are encapsulated within an opaque enclosure.

16. The tamper-proof electronic sub-assembly of claim 14, wherein the circuitry is arranged to apply at least a second challenge signal to at least one of the fibres and to receive at least a second output from at least one of the sensors to generate an identifying response to the challenge signal that is unique to the device.

17. The tamper-proof electronic sub-assembly of claim 14, wherein at least some of the optical fibres are at least one of the following:
partially covered by a coating;
in contact with each other; and
coupled with itself.

* * * * *